United States Patent

[11] 3,604,563

[72] Inventor Michael P. Ronan, Jr.
 Citrus Heights, Calif.
[21] Appl. No. 6,336
[22] Filed Jan. 28, 1970
[45] Patented Sept. 14, 1971
[73] Assignee Moore Dry Kiln Company
 Jacksonville, Fla.

[54] LUMBER SORTER
 12 Claims, 3 Drawing Figs.
[52] U.S. Cl. .................................................. 209/74,
 209/125, 214/1 P
[51] Int. Cl. ..................................................... B07c 5/38
[50] Field of Search.......................................... 209/125,
 74, 73, 72, 90; 294/74; 214/300, 301, 302, 1 P

[56] References Cited
 UNITED STATES PATENTS
 2,322,655 6/1943 Morgan........................ 209/74 X
 3,506,142 4/1970 White............................ 214/1 P

*Primary Examiner*—Allen N. Knowles
*Attorneys*—George H. Baldwin and Arthur G. Yeager ABSTRACT: A drop sorter for lumber having a frame and plurality of lumber delivery bays and an unloading lumber accumulation sling assembly positioned within each delivery bay. Each sling assembly includes an elongated rigid element having opposite end portions and opposite side portions, a pair of flexible chains respectively supportingly connected to the opposite end portions of the element on one of its side portions with means including a pair of drums connected to the frame for reeling in and paying out each of the pair of chains. Each assembly further includes a plurality of spaced flexible chains each having one of their end portions respectively supportingly connected to the element on its other side portion with means including a plurality of drums connected to the frame for reeling in and paying out each of the plurality of chains. The spacing distance between adjacent ones of the plurality of chains is less than the length of the boards being delivered to the bay whereby the boards are supported on the plurality of chains between the element and the means for reeling the plurality of chains. The distance between the pair of chains is greater than the length of the boards being delivered to the bay whereby an accumulated load of boards are automatically unloaded from the plurality of chains through and between the pair of chains upon paying out of the pair of chains by their respective means for reeling and simultaneously lowering the element.

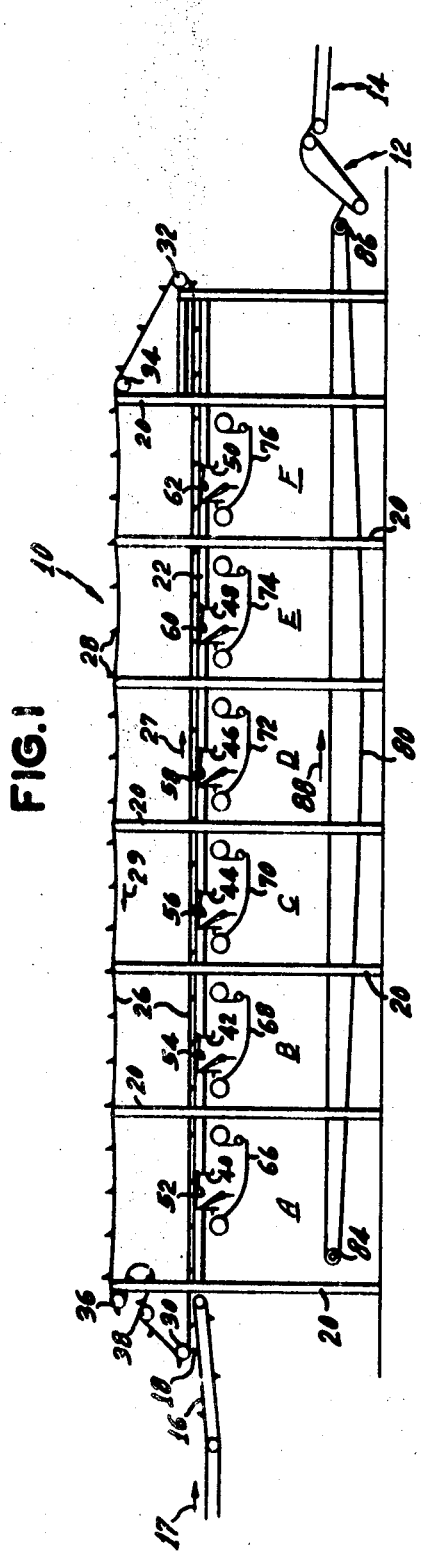
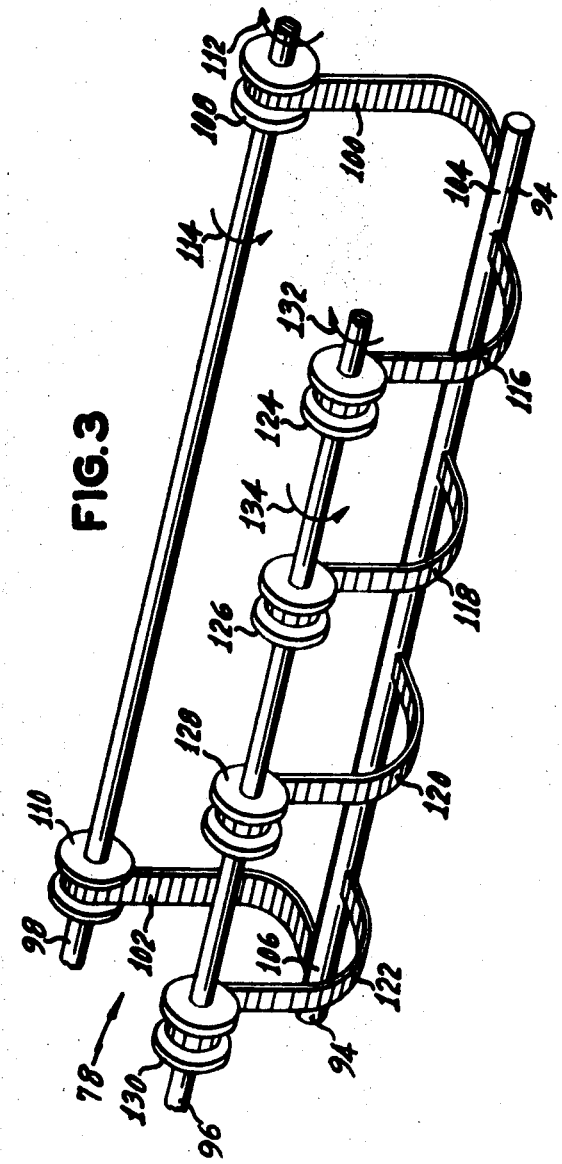

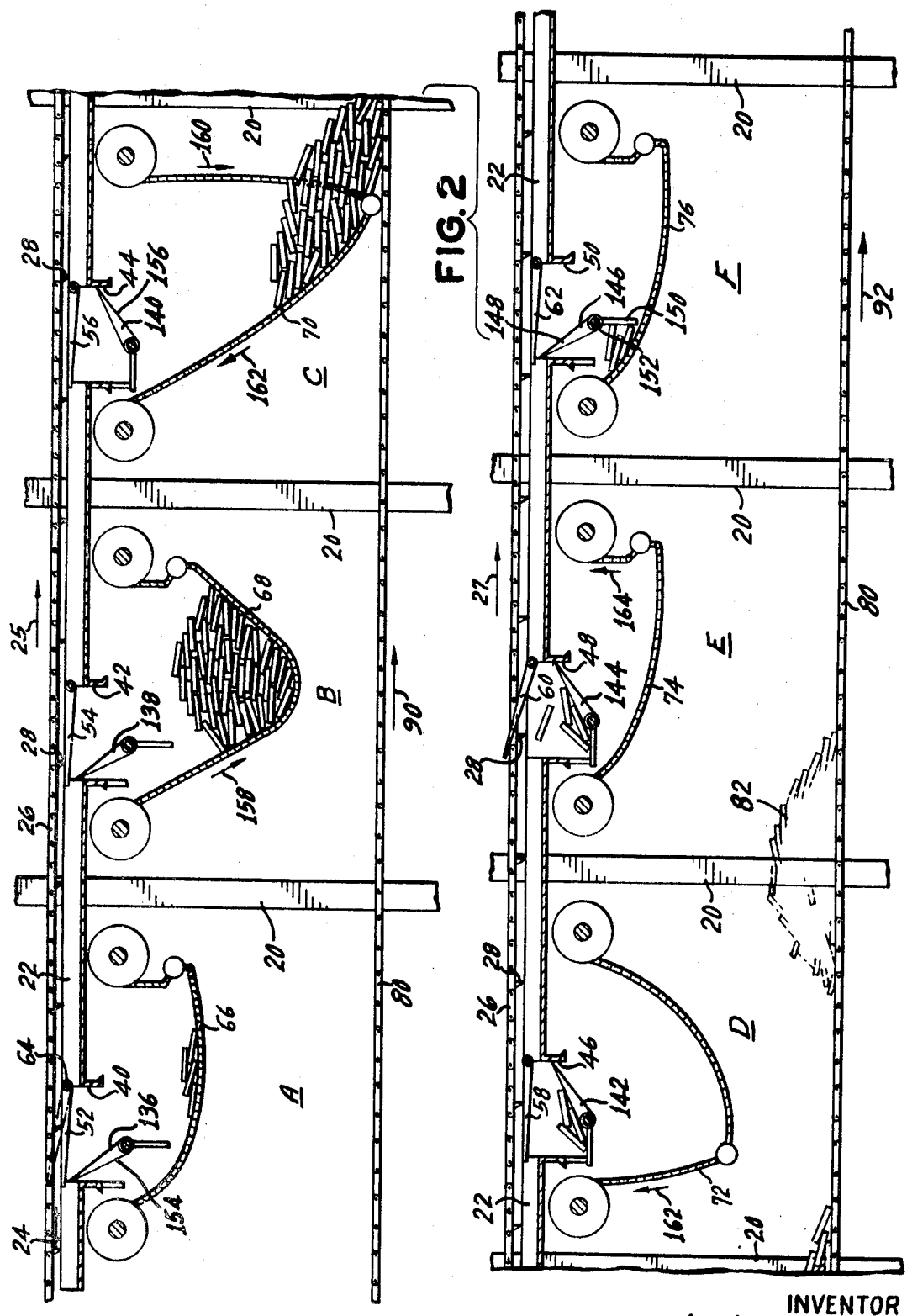

LUMBER SORTER

BACKGROUND OF THE INVENTION

1. Field of the Invention

The present invention relates generally to apparatus and devices used in the handling of lumber of various sizes and lengths, and is more particularly directed to an improved lumber-selecting apparatus or lumber-sorting machine of the drop type. The general principles of the invention disclosed herein may be readily applicable to similar work upon other related materials. In greater detail the invention disclosed herein relates to a unit accumulator mechanism and to such a mechanism as used in conjunction with an automatic unit-sorting device where accumulation of a number of sorted units is desired. Still in more specific detail, the subject invention pertains to a sling-type accumulator mechanism employed in connection with an automatic drop-type lumber-sorting device. By means of the present accumulator mechanism a number of lumber units may be accumulated as a load and readily and automatically unloaded from the sling-type accumulator for subsequent processing operations, such as unscrambling and stacking.

2. Description of the Prior Art

The value and the end use of lumber are determined by such factors as its thickness, width, length and grade. Consequently on various occasions during the manufacturing process thereof and up to the time of ultimate use, the lumber is segregated or sorted into units in which the individual pieces have similar thickness, width, length or grade. The units must be neatly piled and of fairly uniform size to enable them to be efficiently handled by fork or lift trucks. In most cases, certain portions or operations involved in this sorting of the lumber are presently done manually by a number of men, who at times may remove the lumber from a series of moving chains or belts and pile it in unit packages of lumber having similar, width, length, thickness or the like. The manual labor will at times determine the thickness, width and length visually and the grade from a symbol previously marked on each piece of lumber by a skilled lumber grader. The cost of the manual portions of the lumber-sorting and accumulation operations add appreciably to the cost of manufacture of the lumber. The work of the grader requires a certain amount of judgment and so is not economically susceptible to replacement by a machine at the present state of the art, but the other sorting and accumulation operations, some of which are now manually performed, are susceptible to being replaced by machine operations at an economic gain.

Lumber-sorting mechanisms, lumber-sorting machines of the drop type and accumulator mechanisms for employing with lumber-sorting devices have been previously devised, such prior art apparatuses and devices being generally disclosed in the U.S. Pat. Nos. 1,479,593, 1,706,632, 2,285,475, 2,293,018, 2,815,870 2,849,236, 2,998,133, 3,055,515, and 3,085,686. Applicant's invention for an improved drop sorter for lumber and an automatic unloading sling-type accumulator for use therewith, disclosed herein, is an improvement over such prior art devices and apparatuses, as shown for example in the above-mentioned patents.

SUMMARY OF THE INVENTION

A general object of this invention is to provide an improved drop-type lumber-sorting machine which will function automatically to perform certain of the selected acts required in lumber sorting, thereby eliminating some of the now manually performed and required operations.

Another object of the invention is to provide an improved sling-type accumulator mechanism whereby following accumulation of a number of lumber units the delivery of such units to the main load receiving portion of the accumulator is interrupted and thereafter such units are accumulated at a segregated position, the load in the main load receiving portion being meanwhile maintained in the sling accumulator until such time as the operator may conveniently and automatically deliver the accumulated load to transfer transfer mechanism for delivering the same to subsequent processing operations such as unscrambling and stacking.

Yet another object of the subject invention is to provide for the automatic unloading of an accumulator, particularly a sling-type accumulator, employed in an automatic drop-type lumber-sorting machine, which when used in conjunction with one of the device now commonly used for unscrambling and stacking lumber will reduce greatly the number of men required and hence the cost of sorting lumber and manual labor involved in the manufacture of lumber.

A further object of the present invention is to provide substantial savings and economy in labor over that possible with conventional sling accumulator mechanisms, as the accumulator mechanism of the present invention can be automated, requiring the attention of an operator only to the extent of selective control of the delivery of the accumulated load to subsequent processing operations. A related object is to further provide for substantial improvement in the speed of handling accumulated units of lumber whereby the delivery of an accumulated load or package of lumber is reduced to a mere control operation operation insofar as an operator is concerned, thus eliminating the inefficiency and inherent and numerous manual handling operations now employed and involving heavy manual labor.

Still a further object of this invention is to provide automatic unloading accumulation slings for use in an automatic drop-type lumber sorter which reduce the breakage of the boards to a bare minimum by reducing the distance through which they fall, and which, because of their shape, tend to straighten and align the boards therein parallel to each other.

In general, these objects are obtained by providing drop sorter for lumber having a frame, a plurality of lumber delivery bays and an unloading lumber accumulation sling assembly positioned within each delivery bay. Each assembly includes an elongated element having opposite end portions and opposite side portions and a pair of reelable members respectively supporting the opposite end portions of the element adjacent one side portion thereof, with means connected to the frame for reeling in and paying out each of the pair of reelable members. Each assembly further includes a plurality of spaced reelable members each having one of their end portions respectively supporting the element on the other side portion thereof, with means connected to the frame for reeling in and paying out each of the plurality of reelable members. The spacing distance between adjacent members of the plurality of reelable members is less than the length of the boards being delivered to the bay whereby the boards are supported on the plurality of reelable members between the element and the means for reeling the plurality of reelable members. The distance between the pair of reelable members is greater than the length of boards being delivered to the bay whereby an accumulated load of boards are automatically unloaded from the plurality of reelable members through and between the pair of reelable members upon paying out of the pair of reelable members by their respective means for reeling and simultaneous lowering the element.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a side elevational view of drop sorter for lumber employing the automatic unloading slings of this invention;

FIG. 2 is an enlarged partial side elevational view of the improved drop sorter for lumber of FIG. 1, showing the automatic unloading slings in various loading, accumulation and unloading positions; and FIG. 3 is a perspective view of one of the automatic unloading slings employed in the improved drop sorter for lumber of FIG. 1.

DETAILED DESCRIPTION O THE PREFERRED EMBODIMENT

With detailed reference to the drawings, and in particular to FIG. 1 thereof, the improved sorter 10 of this invention is normally used in the manufacture of lumber and the like in connection with various other apparatuses, devices, and processes or operations involved in the manufacture of the completed lumber product, such as a saw, a trimmer, an unscrambler 12 and a stacker 14. The cut and trimmed lumber or boards are usually fed into sorter 10 by means of a conveyor 16 moving in the direction of arrow 17 and having lugs or teeth 18 thereon to engage the individual pieces of lumber or board and deliver the same to sorter 10.

Sorter 10 includes and is supported by a series of columns or posts 20 generally equally spaced from one end of the sorter to the other end thereof and defining therebetween a series of collection or delivery bays of generally equal width and designated by the letters A, B, C, D, E and F in the drawings. Sorter 10 is further provided with a table or slide 22 along and over which the individual boards or pieces of lumber, such as board 24 (see FIG. 2) are dragged or pulled in the direction of arrow 25 by a chain or belt conveyor 26 which rests on top of the boards and moves in the direction of arrows 27 and 29. Conveyor 26 is provided with downwardly extending teeth or lugs 28 at spaced intervals therealong which engage behind the boards to pull the same along sorter table 22. Chain conveyor 26 is of a continuous type and constantly passes over sorter table 22, being driven by powered drive rollers 30 and 32 and passing over guide and idler rollers 34, 36 and 38 before repassing over table 22 after having made a first pass thereover. Sorter table 22 is provided with a plurality of slots or elongated openings 40, 42, 44, 46, 48 and 50 each of which respectively corresponds to and overlies each of collection bays A through F. Slots or openings 40 through 50 are respectively provided with normally closed fingers 52, 54, 56, 58, 60 and 62. Each of fingers 52 through 62 extends across and spans respective slots or elongated openings 40 through 50 such that the boards or pieces of lumber, as at 24 can be pulled or slid across table 22 without the same falling through the respective slots protected or covered by their respective fingers and into one of collection bays A through F therebelow. Fingers 52 through 62 are pivotally attached to sorter table 22 adjacent their end portions opposite to the end from which the boards are being fed onto table 22, as at pivotal attachment 64 of finger 52 above bay A, whereby the fingers may be raised to permit the next arriving board to drop through the protected slot and into the collection bay therebelow, all as seen at collection bays A and E in FIG. 2. Fingers 52 through 62 may be and are often remotely and automatically controlled by sophisticated programming systems employing photoelectric cells for measuring the boards and then automatically raising the fingers of a particular bay when boards of the dimension being received, collected and accumulated in that particular bay arrive at the respective slot or elongated openings.

Positioned within each bay A through F and respectively adjacently below slots or elongated openings 40 through 50 is one of the improved automatic unloading slings 66, 68, 70, 72, 74 and 76 of this invention. Each of the slings, such as that shown in greater detail at reference numeral 78 in FIG. 3, is adapted and arranged to catch and receive the individual boards or pieces of lumber as the same fall through respective slots or elongated openings 40 through 50 in a manner such that the boards or lumber never have far to fall. Sorter 10 further includes a transfer conveyor 80 for transferring and conveying stacks or piles, such as stack 82, of sorted lumber to the unscrambler 12 and stacker 14 or other such various devices and apparatuses for further processing or operations involved in the manufacture of the completed lumber products. Conveyor 80 passes over and is driven by drive rollers 84 and 86, moving in the direction of arrows 88, 90 and 92.

Referring to FIG. 3 in detail, the improved automatic unloading sling 78 shown therein and used within each of the several collection bays A through F, includes a center bar or element 94 which is suspended between a left-hand side rod or shaft 96 and a right-hand side rod or shaft 98. Bar or member 94 is connected to and suspended from right-hand rod or member 98 by a pair of widely spaced flexible chains or belts 100 and 102 respectively connected to outer end portions 104 and 106 of rod 98 at their lower ends. The other or upper ends of chains 100 and 102 are attached to respective spools or drums 108 and 110. Drums or spools 108 and 110 are connected to right-hand rod or member 98 in a manner such that they turn upon rotation of rod 98, with chains 100 and 102 being adapted to wind up or wrap around spools 108 and 110 as rod 98 is rotated in a clockwise direction, as indicated by arrow 112, thereby raising bar or member 94. Upon rotation of rod 98 and drums or spools 108 and 110 therewith in a counterclockwise direction, as indicated by arrow 114, chains 100 and 102 will unwind and play out from respective spools 108 and 110 to thereby lower center member or bar 94.

Center bar or element 94 is further suspended from and connected to left hand rod or member 96 by a plurality of generally equally spaced flexible belts or chains 116, 118, 120 and 122, which have their lower ends attached to bar 94 at generally equally spaced intervals between outer belts or chains 100 and 102 and attached to bar 94 on the opposite side thereof from the ends of chains 100 and 102. The upper or opposite ends of chain members 116 through 122 are attached to respective spools or drums 124, 126, 128 and 130 which are mounted on left-hand rod or member 96 in a manner to turn therewith upon rotation of rod 96. When left-hand rod or member 96 is rotated in a clockwise direction, as indicated by arrow 132, chains or belts 116, 118, 120 and 122 will unwind and fall off of their respective spools or drums 124 through 130 such that center bar or member 94 will be lowered. Upon a counterclockwise rotation of left-hand rod or member 96 as indicated by arrow 134, chains or belts 116 through 122 will roll up and gather on respective spools or drums 124 through 130, thereby raising suspended center bar or member 94. The dimension between belts or chains 100 and 102 should be slightly greater than the length of the longest unit or piece of lumber being fed into and sorted by improved sorter 10 of this invention, as the accumulated load of boards or pieces of lumber accumulated and held in automatic unloading sling 78 will be automatically unloaded from the sling through the space provided between chain members 100 and 102, as will be seen more readily hereinafter. The distance between adjacent chains or belts 116, 118, 120 and 122 should be somewhat less than the length of the shortest unit or piece of lumber fed into and sorted by sorter 10, such that the same will not fall through the openings between adjacent chain or belt members 116 through 122, thereby escaping accumulation in sling 78 prior to the desired automatic unloading thereof. As will be seen more readily hereinafter, the individual pieces of lumber or units which are sorted by sorter 10 are received, held and retained by the belt or chain members on the left-hand side of the automatic unloading sling, such as chain members 116, 118, 120 and 122 of sling 78 depicted in FIG. 3. And the boards or pieces of lumber are automatically unloaded from the improved sling through the space provided between the right-hand chain members, such as chains 100 and 102 of sling 78 shown in FIG. 3.

Sorter 10 is additionally provided with finger-type accumulators 136, 138, 140, 142, 144 and 146 within respective collection bays A, B, C, D, E and F and directly beneath and partially within respective slots or elongated openings 40, 42, 44, 46, 48 and 50. Each accumulator includes a guide arm or member, such as guide arm 148 of accumulator 146 within bay F, and a support arm or member, such as support arm 150 of accumulator 146, which are fixed at an obtuse angle to each other. All accumulators 136 through 146 further include a rod, such as rod 152 of accumulator 146, on which the arms or members are mounted and about which they are pivotable from an inoperative, nonaccumulating position 154, such as at collection bays A, B, and F of FIG. 2, to an operative, accumulating position 156, such as depicted at collection bays C, D and E of FIG. 2. The purpose and function of accumulators 136 through 146 is to receive, hold and accumulate the incoming boards or pieces of lumber to any given collection bay during the time intervals when the sling of that given bay is unloading and being repositioned to its original starting position for receipt of an additional load of boards.

When employing the automatic unloading slings of this invention 66 through 76, and as shown in detail at 78 in FIG. 3, with the improved sorter 10, the same are started in the positions shown in FIG. 1 and at collection bay E of FIG. 2 when beginning the lumber-sorting operation. In this position, as shown in FIG. 1 and at collection bay E in FIG. 2, the right-hand chain or belt members of the sling, as chains 100, 102 of sling 78 shown in FIG. 3, are substantially completely rolled onto and taken up by their respective reels or drums, as reels 108, 110 of FIG. 3; and the left-hand chain or belt members, as chains 116 through 122 of FIG. 3, are partially unrolled and slackened from their respective reels or drums, as reels 124 through 130 of FIG. 3, such that the center bar of each sling, as bar 94 of sling 78 in FIG. 3, is positioned substantially beneath the right-hand reels and the left-hand chains extend therefrom to the left-hand reels with a slight slack therein. Upon the delivery, receipt and accumulation of boards or pieces of lumber within the sling, the same resting on and being supported by the left-hand chain members, as in collection bays A and B of FIG. 2, the left-hand chain members will gradually slacken and be unrolled from the left-hand reels, in the direction of arrow 158, in a manner such that the same may accommodate and accumulate a larger load of boards or lumber as depicted in collection bay B of FIG. 2. The gradual lengthening of the left-hand chain members can be controlled by a braking system or by the direct drive of the left-hand reels and the left-hand rod member to which they are mounted. During this lengthening or unwinding of the left-hand chain members, in the direction of arrow 158 as depicted at collection bay B of FIG. 2, the stack of lumber or pieces of board builds up in height on the left-hand chains such that the incoming units never have far to fall.

Upon receipt of a full or predetermined load within a sling, the unloading and repositioning cycle of the sling is begun, as depicted in delivery bay C of FIG. 2. The first step in this unloading cycle is the pivoting of the accumulator from its inoperative nonaccumulating position 154 (bay A) to its operative accumulating position 156 as depicted in collection bay C. Next the chain members on the right-hand side of the sling will be unrolled from their respective reels and extended in the direction of arrow 160 such that the center bar as bar 94 in FIG. 3, becomes positioned closely adjacent the upper surface of transfer conveyor 80 moving in the direction of arrow 90 whereby the load of boards within the sling will fall outward thereof between the right hand chain members, as at 100 and 102 of FIG. 3, and onto transfer conveyor 80 to be delivered thereby to unscrambler 12 and stacker 14 or other like devices for further processing. To insure complete emptying of the sling while the center bar thereof is closely adjacent transfer conveyor 80, the left-hand chain members will be taken up in the direction of arrow 162 and rolled on to their respective reels, all as depicted in collection bay C and D. Upon the complete emptying of the sling, the right-hand chain members will be taken up in the direction of arrow 164 and rolled on to their respective spools to reposition central bar or member adjacently below the right-hand spools or reels, and the left-hand chain members will be slackened and elongated if necessary to return the sling to its original starting position, as depicted in collection bay E of FIG. 2, for receipt of another load of lumber. Once the sling has been unloaded and repositioned to the position depicted in collection bay E, the accumulator, as at 146, on which the pieces of lumber or boards have been accumulating during the unloading and repositioning of the sling, as depicted in collection bays C, D and E, will trip from its operative accumulating position 156 into its inoperative nonaccumulating position 154 to unload the boards which have been accumulating thereon into the now repositioned sling, all as depicted in collection by F of FIG. 2, thus finishing the complete cycle of the automatic unloading sling of the improved drop sorter 10 of this invention.

While only a certain preferred embodiment of this invention has been shown and described by way of illustration, many modifications will occur to those skilled in the art and it is intended that all such modifications be included within the true spirit and scope of this invention.

What is claimed as new and what it is desired to secure by Letters Patent of the United States is:

1. In a drop sorter for lumber having a frame and plurality of lumber delivery bays and an unloading lumber accumulation sling assembly positioned within each delivery bay, the improvement wherein each said assembly comprises an elongated element having opposite end portions and opposite side portions, a pair of reelable members respectively supporting said opposite end portions of said elongated element adjacent one said side portion thereof, means connected to said frame for reeling in and paying out each of said pair of reelable members, a plurality of spaced reelable members each having one of their end portions respectively supporting said elongated element on the other said side portion thereof, means connected to said frame for reeling in and paying out each of said plurality of reelable members, the spacing distance between adjacent of said plurality of reelable members being less than the length of the boards being delivered to the bay whereby the boards are supported on said plurality of members between said elongated element and said means for reeling said plurality of reelable members, the distance between said pair of reelable members being greater than the length of boards being delivered to the bay whereby an accumulated load of boards are automatically unloaded from said plurality of reelable members through and between said pair of reelable members upon paying out of said pair of reelable members by their respective means for reeling and simultaneously lowering of said elongated element.

2. In the drop sorter for lumber as defined in claim 1 wherein said means for reeling said pair of reelable members includes a pair of drums spacedly mounted to said frame, said pair of drums being rotatable to reel in and pay out each of said pair of reelable members, said means for reeling said plurality of reelable members includes a plurality of drums spacedly mounted to said frame, said plurality of drums being generally horizontally spaced from said pair of drums and being rotatable to reel in and pay out each of said plurality of reelable members.

3. In the drop sorter for lumber as defined in claim 2 wherein said pair of drums is spacedly mounted to a first shaft, said first shaft being rotatably mounted to said frame, said pair of drums being rotatable with said first shaft to simultaneously reel in and pay out said pair of reelable members, said plurality of drums are mounted at spaced intervals to a second shaft, said second shaft being rotatably mounted to said frame and generally horizontally spaced from said first shaft, said plurality of drums being rotatable with said second shaft to simultaneously reel in and pay out said plurality of reelable members.

4. In the drop sorter for lumber as defined in claim 1 wherein each of said pair and plurality of reelable members includes a flexible chain.

5. In the drop sorter for lumber as defined in claim 1 wherein said elongated element is a rigid and a generally unbendable element whereby adjacent ones of said plurality of reelable members are spacedly maintained.

6. In the drop sorter for lumber as defined in claim 1 wherein each of said pair of reelable members has one of their end portions respectively connected to said opposite end portions of said elongated element adjacent one side portion thereof.

7. In the drop sorter for lumber as defined in claim 1 wherein the spacing distance between adjacent ones of said plurality of reelable members is equal.

8. In the drop sorter for lumber as defined in claim 1 further comprising an accumulator assembly positioned within each delivery bay, each said accumulator assembly being positioned adjacent the top of the delivery bay and attached to said frame, each said accumulator assembly being adapted and arranged to receive and hold boards being delivered to the bay during the time interval when said sling assembly is unloading and being repositioned within the bay.

9. In the drop sorter for lumber as defined in claim 8 wherein each said accumulator assembly includes a pair of arms and a shaft, said pair of arms being mounted to said shaft at an obtuse angle with respect to each other, said shaft being rotatably mounted to said frame closely adjacent the top of the delivery bay and adjacent the point of entry of boards into the delivery bay, said shaft and attached pair of arms being rotatable from an accumulating position whereby boards entering the delivery bay are accumulated and held on said shaft and pair of arms to a nonaccumulative position whereby boards entering the delivery bay pass said pair of arms and are delivered to said sling assembly.

10. In the drop sorter for lumber as defined in claim 9 wherein each said accumulator assembly includes a second pair of arms mounted to said shaft, said second pair of arms being generally horizontally spaced from said pair of arms.

11. In the drop sorter for lumber as defined in claim 1 wherein each of said pair of reelable members is of equal length.

12. In the drop sorter for lumber as defined in claim 1 wherein each of said plurality of reelable members is of equal length.